: US005909552A

United States Patent [19]
Jensen et al.

[11] Patent Number: 5,909,552
[45] Date of Patent: Jun. 1, 1999

[54] METHOD AND APPARATUS FOR PROCESSING PACKED DATA

[75] Inventors: Allen Peter Jensen; Michael Terrell Vanover, both of Austin, Tex.

[73] Assignee: International Business Machines Corporation, Armonk, N.Y.

[21] Appl. No.: 08/032,764

[22] Filed: Mar. 16, 1993

Related U.S. Application Data

[63] Continuation of application No. 07/614,353, Nov. 15, 1990.

[51] Int. Cl.$^6$ .................................................. H03M 7/44
[52] U.S. Cl. ................................ 395/200.64; 364/715.1; 341/60; 341/67
[58] Field of Search ...................... 395/500, 775, 395/800, 325, 725, 200.64; 364/736, 786, 715.1; 341/67, 65, 60

[56] References Cited

U.S. PATENT DOCUMENTS

| | | | |
|---|---|---|---|
| H472 | 5/1988 | Peterson | 364/200 |
| 4,064,556 | 12/1977 | Edelberg et al. | 395/775 |
| 4,321,668 | 3/1982 | Flynn et al. | 364/200 |
| 4,371,923 | 2/1983 | Hyatt | 364/200 |
| 4,569,016 | 2/1986 | Hao et al. | 364/200 |
| 4,595,911 | 7/1986 | Kregness et al. | 395/375 |
| 4,598,365 | 7/1986 | Boothroyd et al. | 364/200 |
| 4,780,842 | 10/1988 | Morton et al. | 395/375 |
| 4,878,166 | 10/1989 | Johnson et al. | 364/200 |
| 4,918,647 | 4/1990 | Downey | 395/325 |
| 4,942,516 | 7/1990 | Hyatt | 364/200 |
| 4,949,246 | 8/1990 | O'Dell et al. | 395/325 |
| 4,963,867 | 10/1990 | Bertrand | 364/715.1 |
| 5,040,136 | 8/1991 | Kanoh | 364/715.1 |
| 5,068,819 | 11/1991 | Misra et al. | 364/736 |
| 5,079,548 | 1/1992 | Fujiyama et al. | 341/67 |
| 5,113,516 | 5/1992 | Johnson et al. | 395/500 |
| 5,123,091 | 6/1992 | Newman | 395/325 |
| 5,140,322 | 8/1992 | Sakagami | 341/65 |
| 5,146,220 | 9/1992 | Ishikawa | 341/67 |
| 5,162,795 | 11/1992 | Shirota | 341/67 |
| 5,189,636 | 2/1993 | Patti et al. | 364/786 |
| 5,237,701 | 8/1993 | Bertrand | 395/800 |
| 5,251,321 | 10/1993 | Boothroyd et al. | 395/775 |

FOREIGN PATENT DOCUMENTS

| | | |
|---|---|---|
| 0296457 | 6/1988 | European Pat. Off. . |
| 57-164334 | 1/1983 | Japan . |

OTHER PUBLICATIONS

IBM TDB, "Partial Byte Computations," vol. 17, No. 17, Dec. 1974, pp. 1931–1932.
*The 11th Annual International Symposium on Computer Architecture*, Jul. 1984, Michigan, "A High Performance Factoring Machine", Rudd et al, pp. 297–300.
*IBM Technical Disclosure Bulletin*, vol. 23, No. 9, pp. 4357–4360, Feb. 1981 "Double–Speed, Single–Precision Vector Register Organization Using Double–Port Chips".
*IBM Technical Disclosure Bulletin*, vol. 27, No. 11, pp. 6777–6778, Apr. 1985, "Technique for Halving Vector Load Times".
IBM Technical Disclosure Bulletin, vol. 31, No. 8, pp. 204–205, Jan. 1989, "Fastener Decimal Division".
*IBM Technical Disclosure Bulletin*, vol. 32, No. 3A, pp. 325–329, Aug. 1989, "Easy Biased Exponent Handling Via 2's Complement Arithmetic".

*Primary Examiner*—Tariq R. Hafiz
*Attorney, Agent, or Firm*—Volel Emile; Paul S. Drake

[57] ABSTRACT

A method and an apparatus for processing a plurality of operands in parallel including packing the operands into a word with at least one cleared buffer bit between each operand and processing the packed word.

17 Claims, 6 Drawing Sheets

```
              HEX              BINARY

OP1     OP2     OP3
                            ┌─────┐ b ┌───┐ b ┌───┐
                            +/-      +/-      +/-
        OP_a    6423        0 1 1 0 0 1 0 0 0 1 0 0 0 1 1 1

OP_b    FE2B    +   1 1 1 1 1 1 1 0 0 0 1 1 0 1 1 1

OP_c    624E        0 1 1 0 0 0 1 0 0 1 1 1 1 1 1 0

MASK    FEFB  and   1 1 1 1 1 1 1 0 1 1 1 1 0 1 1 1

OP_d    624A        0 1 1 0 0 0 1 0 0 1 1 1 0 1 1 0
                            └─────┘   └─────┘ └─────┘
                             +49        +7      -2
```

|  | DECIMAL | HEX | BINARY |  |
|---|---|---|---|---|
| OP1a | 50 | 00FA | 0000 0000 0011 0010 | |
| OP1b | +(-1) | FFFF | 1111 1111 1111 1111 | |
| OP1c | 49 | 00F9 | 0000 0000 0011 0001 | |
| OP2a | 4 | 0004 | 0000 0000 0000 0100 | |
| OP2b | +3 | 0003 | 0000 0000 0000 0011 | |
| OP2c | 7 | 0007 | 0000 0000 0000 0111 | FIG. 3 |
| OP3a | (-1) | FFFF | 1111 1111 1111 1111 | PRIOR ART |
| OP3b | +(-1) | FFFF | 1111 1111 1111 1111 | |
| OP3c | -2 | FFFE | 1111 1111 1111 1110 | |

|       | HEX  |     | BINARY |
|-------|------|-----|--------|
| OP_a  | 6423 |     | 0110010001000111 |
| OP_b  | FE2B | +   | 1111111000110111 |
| OP_c  | 624E |     | 0110001001111110 |
| MASK  | FEFB | and | 1111111011110111 |
| OP_d  | 624A |     | 0110001001110110 |

Above the binary column: OP1 (+/-) b OP2 (+/-) b OP3 (+/-)

Below OP_d binary: +49, +7, -2

METHOD AND APPARATUS FOR PROCESSING PACKED DATA

This is a continuation of application Ser. No. 07/614,353 filed Nov. 15, 1990.

DESCRIPTION

1. Technical Field

The present invention relates generally to parallel computing and more specifically to executing arithmetic and logical operations on packed data.

2. Background Art

A block diagram of a typical scalar computer is shown in FIG. 1. The computer 100 includes a main processor 110 coupled to a memory 120, an input device 130 and an output device 140. Input device 130 may include a keyboard, mouse, tablet or other types of input devices. Output device 140 may include a text monitor, plotter or other types of output devices. The main processor may also be coupled to a graphics output device 160 such as a graphics display through a graphics processor 150. Graphics processor 150 receives instructions regarding graphics from main processor 110. The graphics card then executes those instructions and generates RGB signals to the graphics display 160 thereby rendering the desired graphics output from the workstation processor.

Multiple main processors are sometimes used to perform parallel processing. That is, more than one processor is executing instructions at the same time. However, due to the linear nature of many algorithms and processes, this approach may not be advantageous in all circumstances.

DISCLOSURE OF THE INVENTION

The present invention provides a method and an apparatus for processing a plurality of operands in parallel including packing the operands into a word with at least one cleared buffer bit between each operand and processing the packed word.

The present invention also provides a method of generating a region code for an X coordinate and a Y coordinate by packing the X coordinate and the Y coordinate into a first packed word with at least one buffer bit between the X and Y coordinates, packing the minimum and maximum values of the window into a second and a third packed words, generating a first and a second region subcode by comparing the first packed word with the second and third packed words, and then generating the region code by combining the first region subcode with the second region subcode.

A further understanding of the nature and advantages of the present invention may be realized by reference to the remaining portions of the specification and the drawings.

BRIEF DESCRIPTION OF THE DRAWINGS

FIG. 3 is an example of three add operations using separate words as performed in the prior art;

BEST MODE FOR CARRYING OUT THE INVENTION

Both the main processor and the graphics processor typically use 8, 16, or 32 bit registers to store words of data, instructions, etc. The instructions are used by the processors to perform various arithmetic and logical operations on the words of data. Negative numbers are often represented in two's complement to facilitate these operations. Communication within the processors and between processors is also usually with 8, 16 or 32 bit instructions or words of data.

Figure 1:
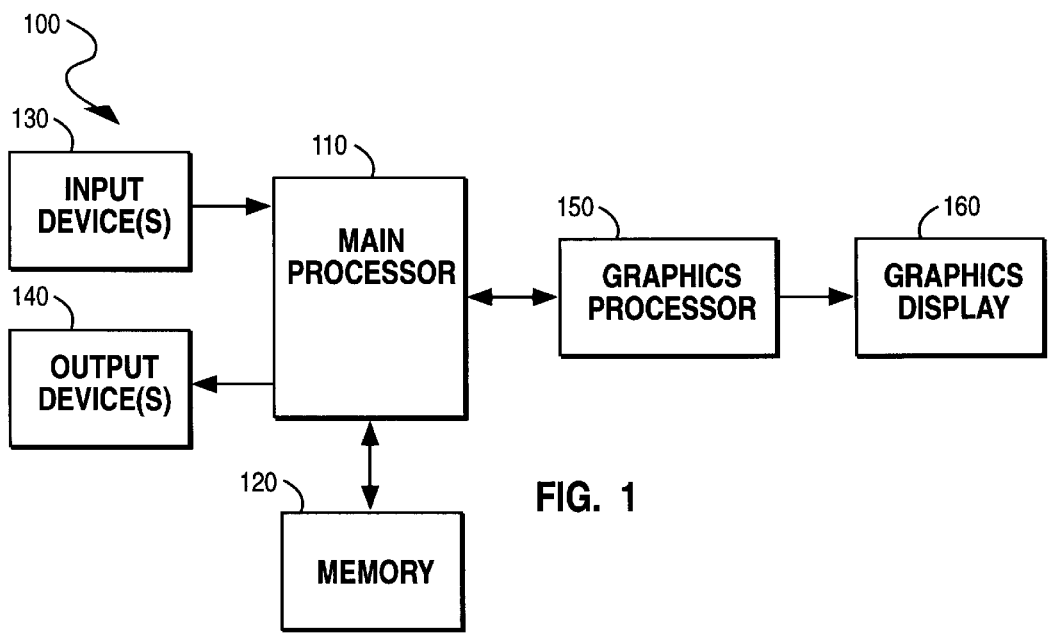
FIG. 1 is a block diagram of a typical scalar computer.
Figure 2:
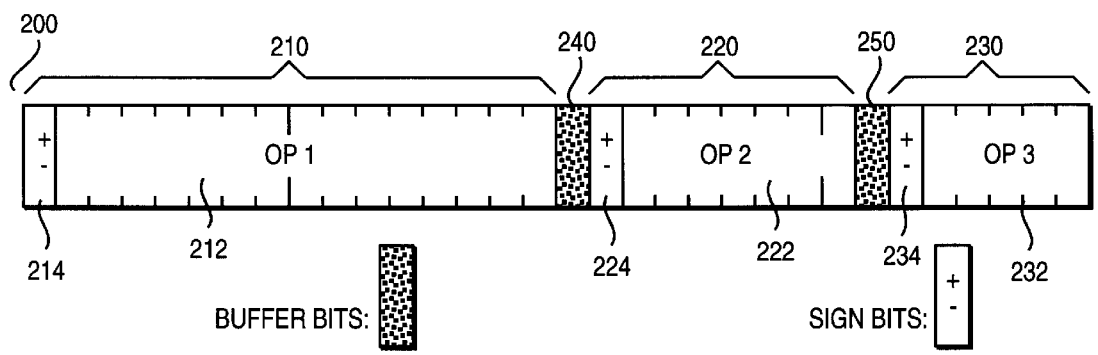
FIG. 2 is a diagram of multiple operands packed into a single word according to a preferred embodiment of the invention.

FIG. 2 is a diagram of three operands 210, 220 and 230 packed into a single 32 bit word 200 according to a preferred embodiment of the invention. Each operand includes a number of bits for data 212, 222, 232, plus a single signed bit 214, 224, 234. Also included between the operands are buffer bits 240, 250 that are set to zero prior to arithmetic or logical operations being performed upon the packed word 200. In two's complement arithmetic, a negative result in signed arithmetic operation causes propagation of a signed bit to the most significant bit. To prevent this propagation from flowing into bits of another operand's result, at least one buffer bit is reserved between each operand. These bits are preferably cleared (set to zero) before any arithmetic or logical operation involving signed arithmetic and again before evaluating results. The operand at the most significant bit of the word does not require a buffer bit because overflows will propagate into an ALU (arithmetic logic unit) carry bit or will be lost without affecting the arithmetic result. If more than one buffer bit is used between the operands, then multiple arithmetic and logical operations (at least equal to the number of buffer bits) may be performed on the packed word between clearing the buffer bits without concern as to whether the operations will cause sign bit overflow. Each operand in the packed word can be varied in size and location. The number of operands used can also vary. The number of parallel operations achievable is limited to the number of useful operands with buffer bits that can be placed in a single ALU word.

FIG. 3 is an example of three add operations using 16 bit words as performed in the prior art. Each of the operations is shown in decimal, hexadecimal and binary. In a first operation, 50 is added to −1 resulting in a value of 49. In a second operation, 4 is added to 3 for a result of 7. In a third operation, −1 is added to −1 resulting in a value of −2. The typical computer uses at least three cycles to perform these operations, not including any load or store functions.

Figures 4, 5:
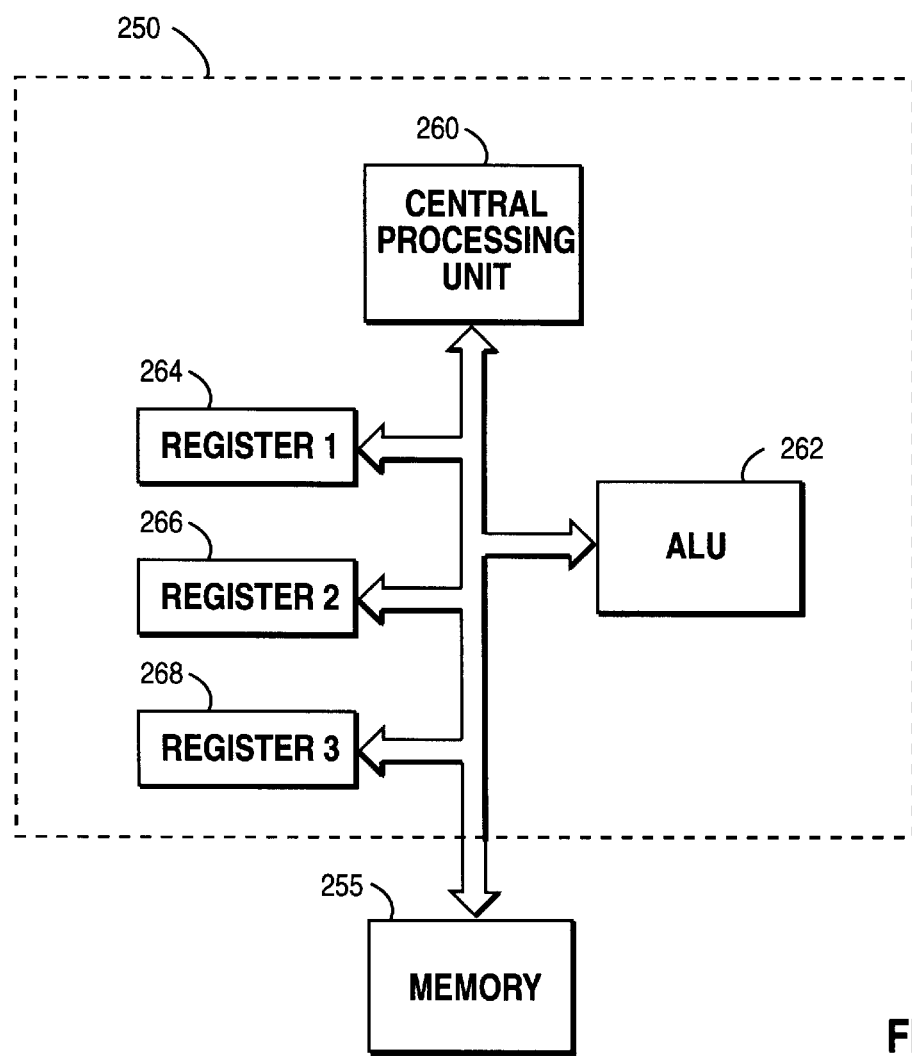
FIG. 4 is an example of the same add operations using a packed word according to a preferred embodiment of the invention.
FIG. 5 is a block diagram of a processor with a memory for packing, processing and unpacking words.

FIG. 4 shows the same add operations using a packed 16 bit word with cleared buffer bits. As can be seen from the operation, the first operand (OP1) is 7 bits long, the second operand (OP2) is 4 bits long, and the third operand (OP3) is 3 bits long. In addition, there are 2 buffer bits (b) between the operands resulting in a total of 16 bits. The first set of operands ($OP_{13}a$) contains the values 50, 4 and 3. The second set of operands ($OP_{13}b$) contains the values −1, 3 and −1. The third set of operands ($OP_{13}c$) contains the results of the addition. One of the resulting buffer bits was set to 1 because of a carry forward of a sign bit. The buffer bits are set to 0 by using a logical and operation with a mask. The resulting fourth set of operands ($OP_{13}d$) contains the desired values of 49, 7 and −2 which match the results of FIG. 3. The final masking step is not necessary if there are not going to be any further arithmetic or logical operations to be performed on the packed word.

Figure 6:
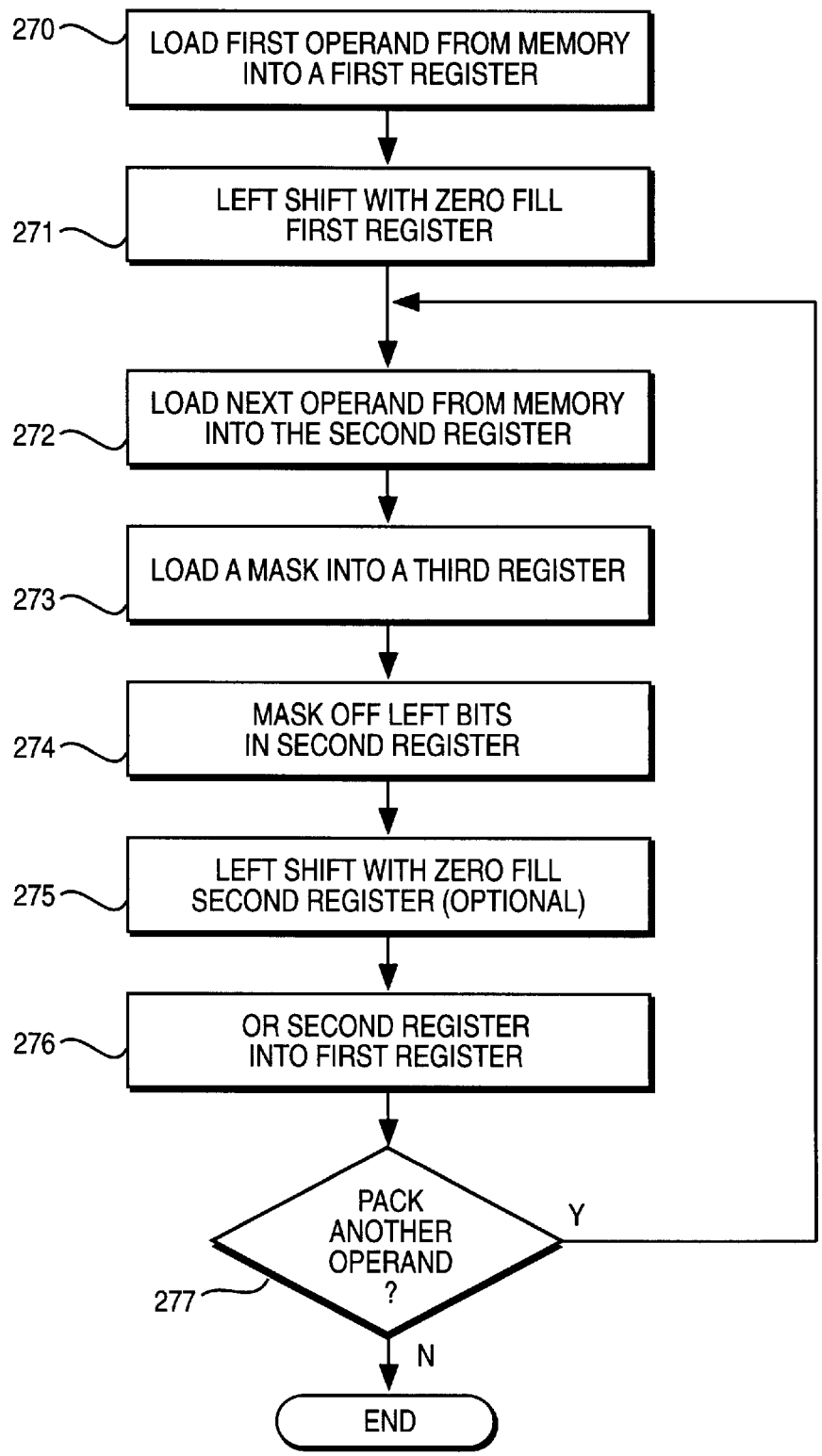
FIGS. 6 and 7 are flowcharts of the packing and unpacking of words.
Figure 7:
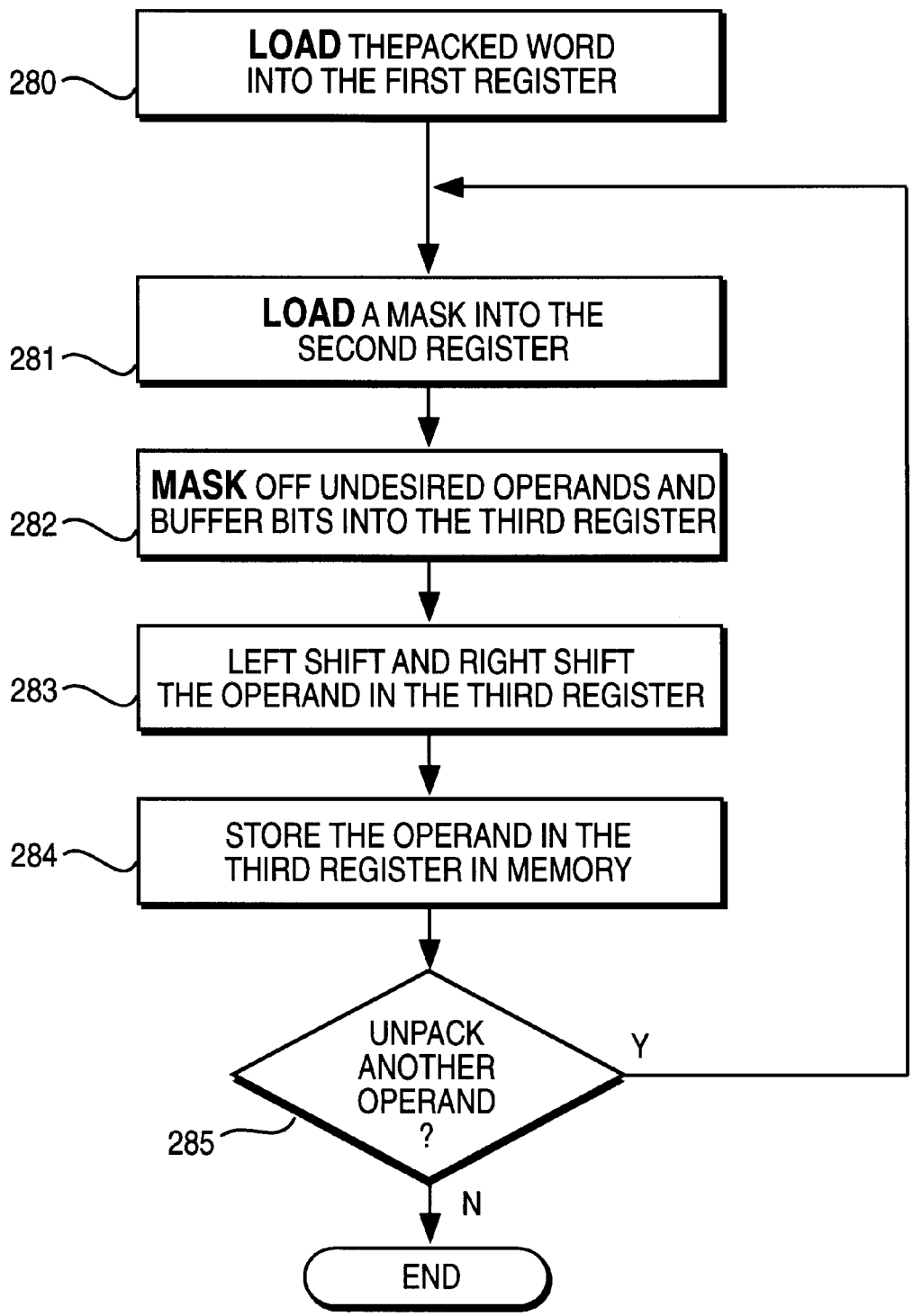

FIG. 5 is a block diagram of a processor 250 with a memory 255 for packing, processing and unpacking words. FIGS. 6 and 7 are flowcharts of the packing and unpacking of words using the processor and memory of FIG. 5. In the preferred embodiment, processor 250 can be found in a computer main processor or in a graphics processor. Processor 250 includes a central processing unit (CPU) 260, an arithmetic logic unit (ALU) 262, and registers 264, 266 and 268.

FIG. 6 is a flowchart of the process for packing multiple operands into a single word. In a first step 270, a first operand stored in memory 255 is loaded into a first register 264 by CPU 260. In a second step 271, the operand in the first register is left shifted with zero fill a predetermined number of bits by ALU 262. In the third step 272, a second operand is loaded from memory into the second register 266 by the CPU. In the fourth step 273, a mask is loaded from memory or is generated by the CPU into the third register 268. In step 274, the ALU then uses the mask to mask off the left hand bits of the operand in the second register. If the operand in the second register is not the last operand to be packed into the packed word, then the ALU will left shift the second register a predetermined number of times by the ALU in step 275. In step 276, the operand in the second register is then ORed with the contents of the first register into the first register by the ALU. The CPU then determines whether to pack another operand into the packed word in step 277.

The buffer bit is generated and cleared between operands by either the left shift zero fills or by the masking. In addition, the buffer bits may be cleared after the packing process with a mask. In alternative embodiments, the packed word may be filled with operands from left to right, right to left, or in any order than is desired.

FIG. 7 is a flowchart of the process for unpacking multiple operands from a single packed word. In a first step 280, a packed word is loaded into the first register 264 from memory 255 by ALU 262. In a second step, a mask is loaded from memory or is generated by the CPU into the second register 266. In step 281, the ALU then uses the mask to mask off the undesired operands, resulting in a desired operand in the third register 268. In the next step 283, the operand in the third register is left shifted and then right shifted to sign extend the operand. The resulting operand is then loaded into memory by the CPU in step 284. The CPU then determines whether to unpack another operand from the packed word in step 285.

This technique is particularly useful for two's complement integer arithmetic using adds, subtracts and compares with operand values that are limited in size. One of the better uses of this technique is in two dimensional graphics operations and in windowing applications. The X and Y coordinates for each vertex or point on the screen are limited to 16 bits in most applications. For example, graphics displays are commonly 1280 by 1024 pixels in size. The number of bits necessary to represent any pixel in X and Y integer coordinates is 11 bits in X and 10 bits in Y. If organized in memory sequentially, a single 32 bit read can carry both X and Y coordinates of a vertex into a processor with 32 bit wide register. Assuming the numbers are in screen or window coordinates, this buffer bit can then be cleared without any loss of data.

Upon completion of all computations on a vertex, it must be output to the rendering hardware. In general, to increase effective bus bandwidth and reduce I/O addresses required, it is necessary to output these operands in a packed format. A major advantage of the technique outlined here is that it allows all the processing to occur in packed form. This circumvents the need to first unpack, process then repack the vertex data.

Figures 8, 9:
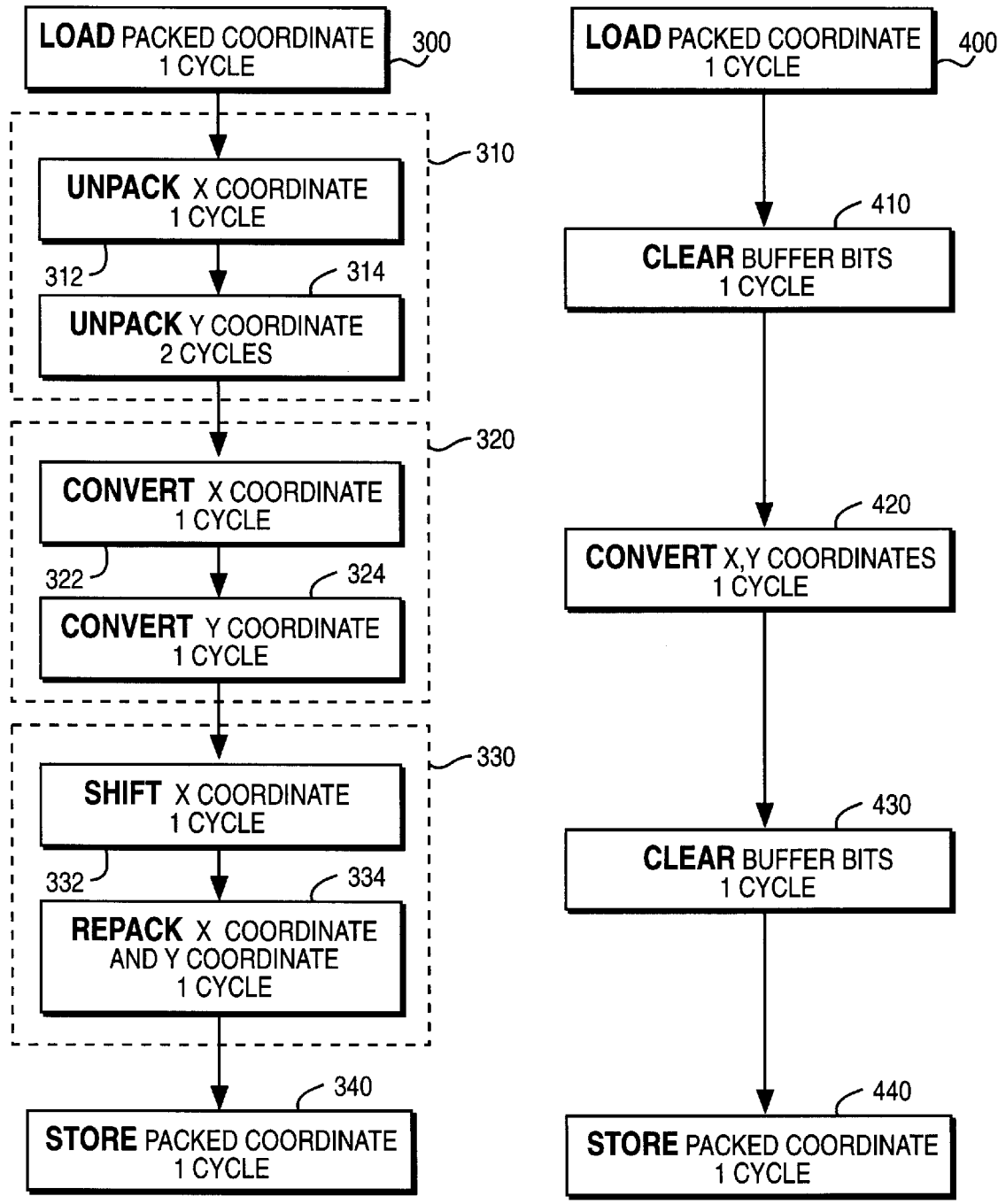
FIG. 8 is a block diagram of a prior art technique for converting a point in window coordinates to a point in screen coordinates.
FIG. 9 is a block diagram of a technique according to a preferred embodiment of the invention for converting a point in window coordinates to a point in screen coordinates.
Figure 12:
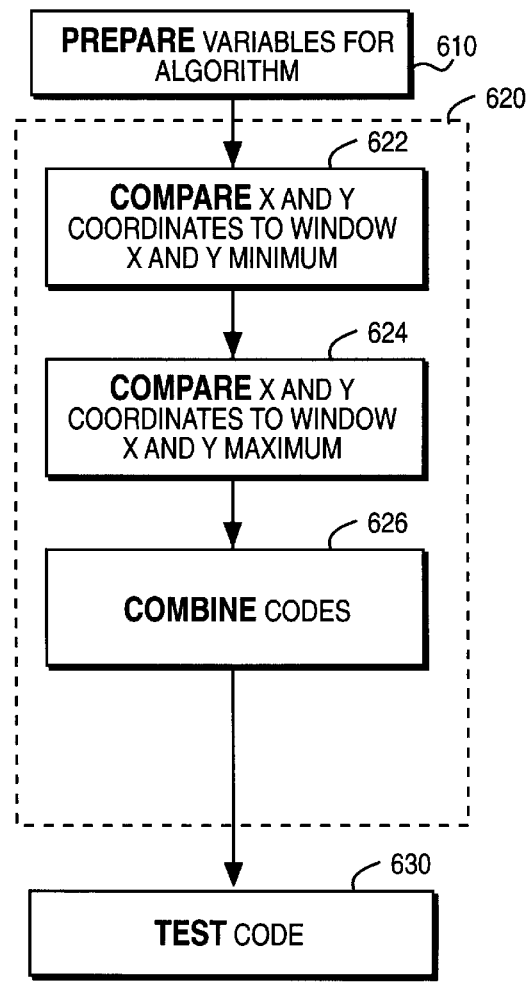
FIG. 12 is a block diagram of a process for generating region codes for the Cohen-Sutherland clipping algorithm using a preferred embodiment of the invention.

FIGS. 9 and 12 describe processes using the processor and memory of FIG. 5 in which packed values can be used in conjunction with packed arithmetic to increase processor throughput. Portions of the processes are grouped to show relative number of cycles per operation. The examples shown are important because they combine to form an loop for two dimensional vector processing. The cycles saved in this loop dramatically affect two dimensional vector performance.

FIG. 8 is a block diagram of a prior art process for converting a point in window coordinates to a point in screen coordinates. In 32 bit computers, the X and Y coordinates are typically stored in memory in a packed format. That is, the X coordinate is stored in the first 16 bits of the 32 bit word and the Y coordinate is stored in the second 16 bits of the 32 bit word.

In a first step 300, the packed coordinate value is loaded into a first register from memory. The packed coordinate is then unpacked into X and Y coordinates in a second step 310. This can be accomplished in step 312 by first loading the packed word into an X coordinate register then right shifting the the register by 16 bits. In many computers, this can be performed in a single step. The Y coordinate is then unpacked in step 314 by left shifting the unpacked word by 16 bits then right shifting the word by 16 bits. This process of shifting the Y coordinate to the left and right extends the coordinate if its value is negative. Step 312 is typically performed in 2 cycles.

During step 320, the X and Y coordinates are converted from window coordinates to screen coordinates. That is, the X origin value is added to the X coordinate in step 322 and the Y origin is added to the Y coordinate in step 324. The add operations usually take one cycle each to be performed.

During step 330, the X and Y coordinates are repacked into the packed coordinate for being transmitted on a bus or stored in memory. This can accomplished by left shifting the X coordinate by 16 bits as shown in step 332 and then ORing the X coordinate and Y coordinate into the packed coordinate in step 334. This usually takes a total of 2 cycles to be performed.

As shown in step 340, the final value of the packed coordinate is then transmitted on a bus or stored in memory in the next cycle.

Table 1 shows the value of variables during the prior art window to screen conversion process shown in FIG. 5A. for a vertex with window coordinates of 10, −1 in a window with an origin of 100,200 on a screen. The value of the packed coordinate (Packed$_{13}$ Coord), the X coordinate (X_Coord) and the Y coordinate (Y$_{13}$ Coord) are given at the end of each referenced step. For example, at the end of step 300, the packed coordinate value is 000AFFFF with the X and Y coordinate values being equal to 000A and FFFF for 10 and −1, respectively.

TABLE 1

Variable Values during Prior Art Window to Screen Conversion Process

| Step | Packed_Coord | X_Coord | Y_Coord |
|---|---|---|---|
| 300 | 000AFFFF | xxxxxxxx | xxxxxxxx |
| 310 | 000AFFFF | 0000000A | FFFFFFFF |
| 320 | 000AFFFF | 0000006E | 000000C7 |
| 330 | 006E00C7 | 006E0000 | 000000C7 |
| 340 | 006E00C7 | 006E0000 | 000000C7 |

FIG. 9 is a block diagram of a process according to a preferred embodiment of the invention for converting a point in window coordinates to a point in screen coordinates. This process decreases the number of cycles needed to accomplish the window to screen coordinate conversion process.

As in FIG. 8, the first step 400 is to load the packed coordinate value into a first register from memory. In step 410, the buffer bit between the X coordinate value and the Y coordinate value in the packed coordinate is cleared by ANDing the packed coordinate with the hexadecimal value FFFF7FFF. The X Y coordinates are then converted to screen coordinates by adding a packed hexadecimal value for the window origin 420. Optional step 430 again clears the buffer bit by ANDing the packed coordinate with 0FFFF7FFF. This step is not required if the following process ignores or is not affected by the uncleared buffer bits. In a final step 440, the final value of the packed coordinate is then transmitted on a bus or stored in memory in the next cycle.

Table 2 shows the value of variables during the preferred art window to screen conversion process shown in FIG. 9 for a vertex with window coordinates of 10, −1 in a window with an origin of 100,200 on a screen. The value of the packed coordinate (Packed_Coord), the X coordinate (X_Coord) and the Y coordinate (Y_Coord) are given at the end of each referenced step. For example, at the end of step 400, the packed coordinate value is 000AFFFF.

TABLE 2

Variable Values during Preferred Window to Screen Conversion Process

| Step | Packed_Coord |
|---|---|
| 400 | 000AFFFF |
| 410 | 000A7FFF |
| 420 | 006E80C7 |
| 430 | 006E00C7 |
| 440 | 006E00C7 |

As shown by FIGS. 8 and 9, the preferred process takes only 5 cycles as compared to 9 cycles for the prior art process, resulting in a savings of 4 cycles. This savings is primarily due to not unpacking and then repacking the packed coordinate value.

The Cohen-Sutherland clipping algorithm is an algorithm designed to minimize the number of calculations necessary to determine whether a line between two endpoints is within a window. The algorithm efficiently identifies many lines which can be trivially accepted or rejected by using region checks on the endpoints. Intersection calculations are then required only for lines that are neither accepted or rejected. This algorithm is particularly efficient when a window is very large or very small relative to the size of the image to be rendered. That is, when most of the lines of the image to be rendered will be either inside the window or outside the window.

Figure 10:
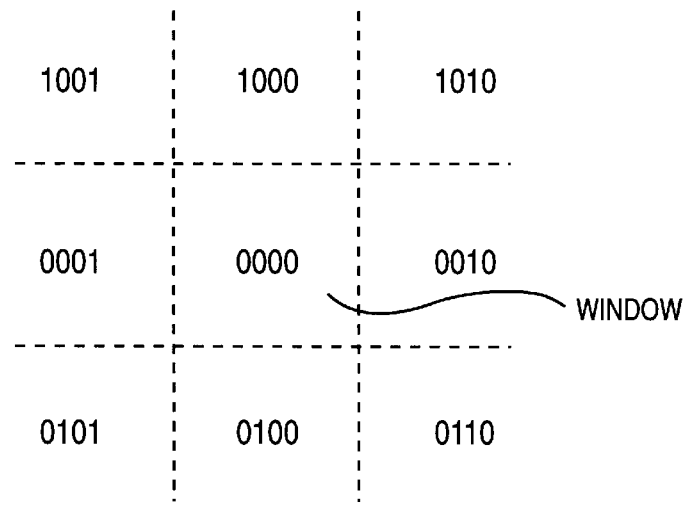
FIG. 10 is a diagram of the 4 bit region codes for the nine regions around and in a window based on the Cohen-Sutherland clipping algorithm.

The algorithm starts by assigning to each end point of a line a 4 bit region code based on the nine regions shown in FIG. 10. Each bit in the region code is set to 1 (true) if the following relations between the end point and window is true (the bits can be in any order as long as the order is consistent for all region codes):

Bit 1—point is above window;

Bit 2—point is below window;

Bit 3—point is to right of window; and

Bit 4—point is to left of window.

If both endpoints are in the window (i.e. their region codes are equal to 0000), then the line is trivially accepted as being completely inside the window. If only one endpoint is in the window, then the line is neither trivially accepted or rejected and computationally intensive line intersection calculations should be performed. If neither endpoint is in the window, then the resulting region codes for the two endpoints of the line are ANDed together. If the resulting joint region code is equal to 0000, then the line can be neither trivially accepted or rejected and computationally intensive line intersection calculations should be performed. If the resulting joint region code is not equal to 0000, then the line is trivially rejected as being completely outside the window.

Figure 11:
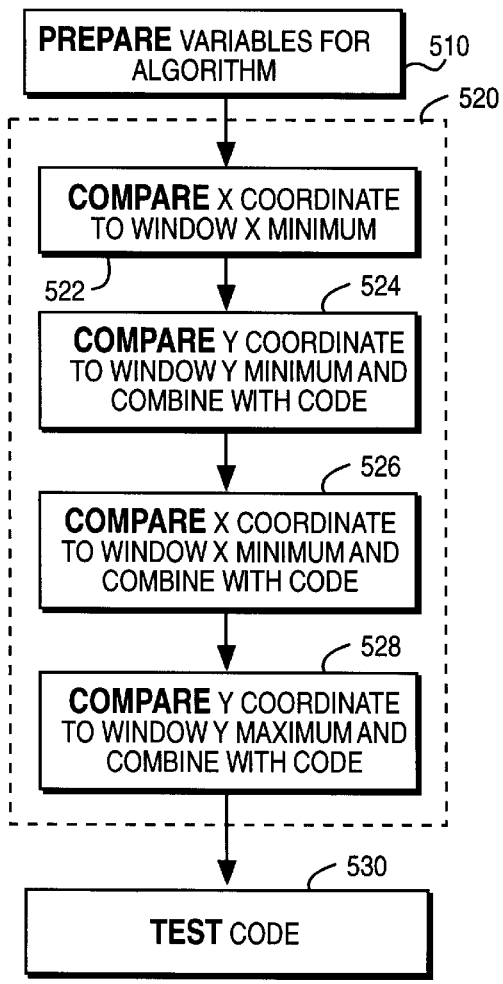
FIG. 11 is a block diagram of the prior art process for generating region codes for the Cohen-Sutherland clipping algorithm.

FIG. 11 is a block diagram of the prior art process for generating region codes for the Cohen-Sutherland clipping algorithm. In a first step 510 the X and Y coordinate values are loaded into separate registers from memory, which may require unpacking, and a sign bit mask with value 80000000 is formed to be used during the algorithm.

In a second step 520, the region code is generated by comparing the X and Y coordinate values to the minimum and maximum X and Y values of the window. In step 522, the first region code bit is equal to the X coordinate minus the minimum X window value with the result ANDed with the sign bit mask. In step 524, the second region code bit is equal to the Y coordinate minus the Y minimum window value with the result ANDed with the sign bit mask. The second region code bit is then left shifted one bit and ORed with the first region code bit, resulting in an initial region code. In step 526, the third region code bit is equal to the maximum X window value minus the X coordinate with the result ANDed with the sign bit mask. The third region code bit is then left shifted two bits and ORed with the previous region code. In step 528, the fourth region code bit is equal to the maximum Y window value minus the Y coordinate with the result ANDed with the sign bit mask. The fourth region code bit is then left shifted three bits and ORed with the previous region code, resulting in the final region code. In a typical computer, step 522 takes 2 cycles, step 524 takes 4 cycles, step 526 take 4 cycles and step 528 takes 4 cycles. This results in a total of 14 cycles to generate the region code once the variables are set up in step 510.

In step 530, the region code bit is then tested to determine whether the region code is equal to 0000.

FIG. 12 is a block diagram of a process for generating region codes for the Cohen-Sutherland clipping algorithm using a preferred embodiment of the invention. In a first step 610 the packed X and Y coordinate value is loaded into a registers from memory, which will not require unpacking, and a packed sign bit mask with value 80004000 is formed to be used during the algorithm.

In a second step 620, the region code is generated by comparing the X and Y coordinate value to the minimum and maximum X and Y values of the window. In step 622, the first two region code bits are equal to the X and Y coordinate value minus the minimum X and Y window value with the result ANDed with the packed sign bit mask. In step 624, the third and fourth region code bits are equal to the X and Y coordinate value minus the maximum X and Y window values with the result negated and then ANDed with the packed sign bit mask. The third and fourth region code bits are then left shifted two bits and ORed with the previous region code bits, resulting in the final region code. Using the preferred embodiment of the invention, step 622 takes 2 cycles, step 624 takes 3 cycles, and step 626 takes 2 cycles. This results in a total of 7 cycles to generate the region code once the variables are set up in step 610.

In step 630, the region code bit is then tested to determine whether the region code is equal to 0000.

As can be seen in FIGS. 9 and 12, the present invention provides for a large increase in speed in handling certain types of processes and algorithms. This increase in speed is substantial if the window coordinates used in the region code generation process shown in FIG. 12 were generated using the process shown in FIG. 9.

Although the present invention has been fully described above with reference to specific embodiments, other alternative embodiments will be apparent to those of ordinary skill in the art. For example, multiply or shift operations can be performed on a packed word if an appropriate number of buffer bits are used between operands. Therefore, the above description should not be taken as limiting the scope of the present invention which is defined by the appended claims.

What is claimed is:

1. A method of processing a plurality of multidigit operands in parallel comprising the steps of:
   a) packing the multidigit operands into a first word with at least one buffer bit between each multidigit operand; and
   b) performing arithmetic operations on the first packed word with a second word, thereby providing a processed packed word.

2. The method of claim 1 wherein the step of performing arithmetic operations includes adding the first packed word with the second word.

3. The method of claim 1 further comprising the step of clearing the buffer bits in the processed packed word.

4. The method of claim 3 further comprising the step of unpacking at least one of the plurality of operands from the processed packed word.

5. The method of claim 4 wherein the step of unpacking comprises:
   a) masking the processed packed word; and
   b) sign extending the masked word.

6. A method of generating a region code for a first multidigit operand and a second multidigit operand from a third multidigit operand, a fourth multidigit operand, a fifth multidigit operand and a sixth multidigit operand comprising the steps of:
   a) packing the first multidigit operand and the second operand into a first word with at least one buffer bit between the first and second multidigit operands;
   b) packing the third multidigit operand and the fourth multidigit operand into a second packed word;
   c) packing the fifth multidigit operand and the sixth multidigit operand into a third word;
   d) generating a first region subcode by comparing the first packed word with the second packed word;
   e) generating a second region subcode by comparing the first packed word with the third packed word; and
   f) generating a region code by combining the first region subcode with the second region subcode.

7. A method of performing at least one arithmetic operation to a first plurality of multidigit operands with a second plurality of multidigit operands comprising the steps of:
   a) packing the first plurality of multidigit operands into a first packed word with at least one buffer bit between each of the plurality of multidigit operands;
   b) packing the second plurality of multidigit operands into a second packed word; and
   c) performing the at least one arithmetic operation with the second packed word to the first packed word.

8. The method of claim 7 further comprising the steps of clearing the at least one buffer bits in the first packed word subsequent to performing the at least one arithmetic operation.

9. The method of claim 8 further comprising the steps of unpacking the first plurality of operands from the cleared first packed word.

10. An apparatus for performing arithmetic operations on a plurality of multidigit operands in parallel comprising:
    a) means for packing the multidigit operands into a first packed word with at least one buffer bit between each multidigit operand; and
    b) means for performing arithmetic operations on the first packed word with a second word, thereby providing a processed packed word.

11. An apparatus of claim 10 further comprising means for clearing the buffer bits in the processed packed word.

12. The apparatus of claim 11 further comprising means for unpacking at least one of the plurality of operands from the processed packed word.

13. An apparatus for performing arithmetic operations on a plurality of multidigit operands in parallel comprising a computer, the computer including:
    a) memory means for storing multidigit operands;
    b) means for packing stored multidigit operands into a first packed word with at least one buffer bit between each multidigit operand; and
    c) means for performing arithmetic operations on the first packed word with a second word.

14. The method of claim 6 further comprising the step of performing arithmetic operations including adding the first packed word with the second packed word.

15. The method of claim 7 wherein the step of performing arithmetic operations includes adding the first packed word with the second word.

16. The method of claim 10 wherein the means for performing arithmetic operations includes means for adding the first packed word with the second word.

17. The apparatus of claim 13 wherein the means for arithmetic operations includes means for adding the first packed word with the second word.

* * * * *